Jan. 10, 1950     D. R. WITTKE     2,494,421
AUTOMOTIVE TRAILER
Filed Sept. 23, 1946     2 Sheets-Sheet 1
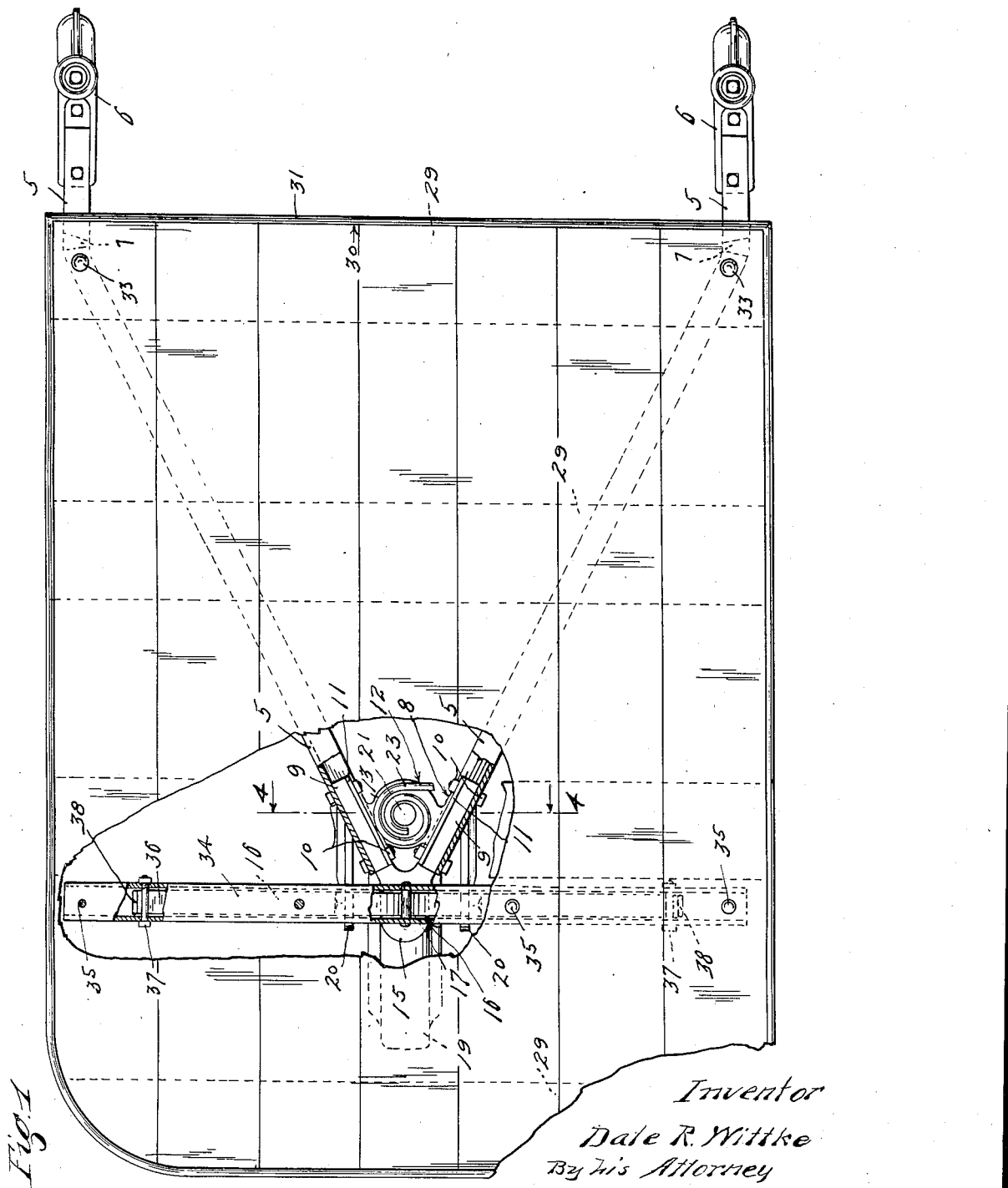
Inventor
Dale R. Wittke
By his Attorney
Harry D. Kilgore Jan. 10, 1950      D. R. WITTKE      2,494,421
AUTOMOTIVE TRAILER
Filed Sept. 23, 1946      2 Sheets-Sheet 2
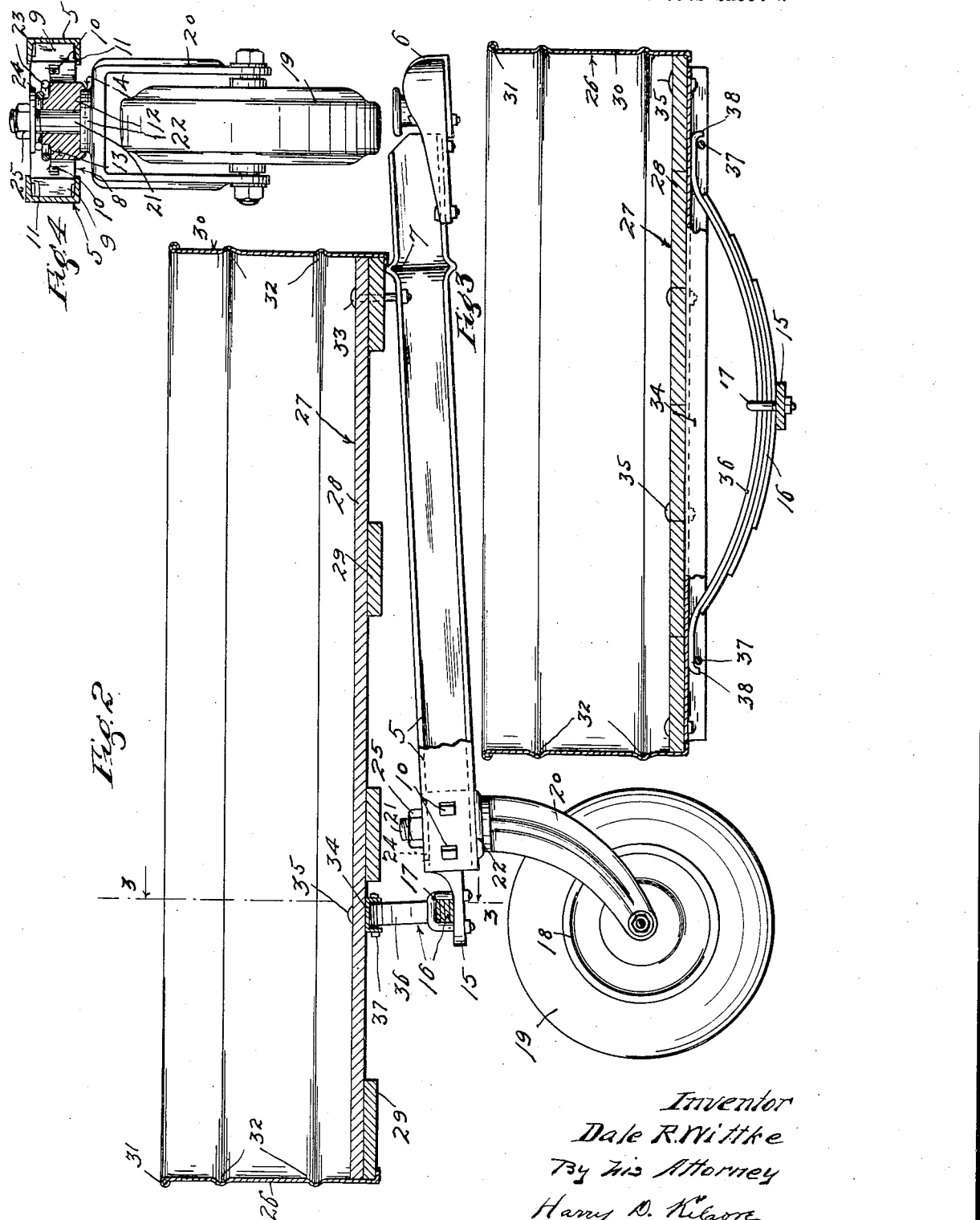
Inventor
Dale R. Wittke
By his Attorney
Harry D. Kilgore Patented Jan. 10, 1950

2,494,421

UNITED STATES PATENT OFFICE 2,494,421

AUTOMOTIVE TRAILER

Dale R. Wittke, Minneapolis, Minn.

Application September 23, 1946, Serial No. 698,687

5 Claims. (Cl. 280—33.4)

My invention relates to improvements in trailers for automotive vehicles, and more particularly to a trailer having a single swivelled wheel and applicable to an automotive vehicle for common steering movement therewith.

The object of this invention is to improve the general structure of the trailer and particularly the mounting of the swivelled fork on which the wheel is journaled.

To the above end the invention consists of the novel structure and arrangement of parts hereinafter described and defined in the claims.

In the accompanying drawings, which illustrate the invention, like characters indicate like parts throughout the several views.

Referring to the drawings:

Fig. 1 is a fragmentary plan view with some parts sectioned;

Fig. 2 is a view partly in side elevation and partly in central vertical section;

Fig. 3 is a view principally in transverse vertical section, taken on the line 3—3 of Fig. 2, and Fig. 4 is a detail view partly in elevation and partly in section, taken on the line 4—4 of Fig. 1.

The trailer frame comprises two channel bars 5, the flanges of which are horizontally disposed and in opposing relation. The front end portions of the channel bars 5 are parallel and the major portions of said bars are in rearwardly converging relation. One of the members of a separable coupling 6 is rigidly secured to the front end portions of each channel bar 5 for attaching the trailer to an automotive vehicle, not shown. These couplings 6 are of the ball and socket type and hold the trailer for common steering movement with the vehicle, but will permit vertical hinge-like movements of the trailer relative to the automotive vehicle.

In bending the angle bars 5 into converging relation, the flanges thereof are outwardly displaced and form transverse ridges.

The upper ridges afford supports 7 for the trailer body as will presently appear.

The channel bars 5 at their rear end portions are rigidly connected by a casting 8. This casting 8 includes a pair of diverging blocks 9 that fit into the channel bars 5 and are attached thereto by nut-equipped bolts 10. These blocks 9 have on their opposing outturned sides ribs 11 that engage the flanges of the channel bars 5 and facilitate the fitting of said blocks into the channel bars 5. The casting 8 further includes a hub 12, located between the two blocks 9. The outer portion of the hub 12, at its upper end portion, is reduced to afford an annular spring seat 13.

Said hub 12, on its under side has an annular recess 14 concentric with the holes in said hub.

The casting 8 also has a rearwardly projecting spring base 15 on which is mounted a four leaf spring 16 secured thereto by a shackle bolt 17.

A wheel 18 having a pneumatic tire 19, is journalled in a fork 20 having at the center of its transverse portion an upstanding pivot stud 21 journalled in the hub 12. On the transverse portion of the fork 20 is an annular center bearing 22, turnably mounted in the recess 14 in the hub 12.

A stiff spiral spring 23 is mounted on the spring seat 13, encircles the pivot stud 21 and is held compressed by a washer 24 on said pivot stud affording a spring cap. This spring cap is adjustably held with the spring 23 compressed by a nut 25 on said stud. The trailer is provided with a body 26 having a platform 27, comprising longitudinal boards 28, rigidly connected on their under sides by a plurality of cleats 29. The sides and two ends of the body 26 are formed of a single piece of sheet metal 30 rigidly secured to the outer edges of the platform 27. Said body 26 at its upper edge is rolled to form an endless bead 31 and the sides of said body are upset to form upper and lower endless reinforcing ribs 32.

The platform 27, at its front end portion, rests on the supports 7 and is secured to the channel bars 12 by nut-equipped bolts 33 which extend through certain of the platform boards 28, the front cleat 29 and the upper flanges of said channel bars 5 rearwardly of the supports 7.

An inverted channel bar 34 extends transversely under the platform 27 and is rigidly secured thereto by nut-equipped bolts 35. The end portions of the leaf spring 16 are upwardly curved and the end portions of the major leaf 36 thereof, extends into the channel bar 34 and supports the rear end portion of the body 26. Nut-equipped bolts 37 extend through holes in the channel bar 34 and under the end portions of the major leaf 36 and prevent the body 26 from lifting relative to the spring 16 but permits free sliding movement of the major leaf 36 on the channel bar 34 during contraction and expansion of said spring. The end portions of the major leaf 36, outwardly of the bolts 35, are bent downwardly to afford stops 38 that cooperate with the bolts 35 to prevent undue lateral movement of the frame and body of the trailer.

The purpose of the spring 23 is to prevent too free a swivel movement of the fork 20 and hence steering movement of the wheel 18. This spring 23 also tightly holds the parts of the assembly on the hub 12 preventing rattle and undue wear.

The drawings illustrate a commercial form of the trailer, but it will be understood that the same is capable of certain modifications as to detail of construction, arrangement and combination of parts within the scope of the invention herein disclosed.

What I claim is:

1. In a vehicle of the class described, a body platform having on its under side an inverted transverse channel bar, a pair of frame channel bars the flanges of which are horizontally disposed and in opposing relation, said frame channel bars having short parallel front end portions and long rearwardly converging portions, a coupling member on the front end portion of each frame channel bar, the upper flanges of the frame channel bars at the corners formed by the parallel and converging portions of said frame channel bars being upwardly displaced to afford supports on which the body platform rests, means rearwardly of said supports connecting the body platform to the frame channel bars, a casting connecting the frame channel bars at their rear end portions and having an upright hub, a fork having an upstanding pivot stud journaled in the hub, a wheel journaled in the fork, said casting also having a spring base, and a multiple leaf spring mounted on the spring base, the upper end portions of the major leaf of the spring extending into the inverted channel bar and supporting the same.

2. In a vehicle of the class described, a frame comprising a pair of channel bars in rearwardly diverging relation and positioned with their flanges in opposing relation, a casting having an upstanding hub and a pair of blocks mounted in the channel bars and rigidly secured thereto, a body platform supported on the channel bars at their front end portions, a fork having an upstanding pivot stud journaled in the hub, said hub having a depressed spring seat encircling said stud, a nut on the pivot stud, a washer on said stud under the nut and affording a spring cap, a spiral spring encircling the pivot stud and compressed between the spring seat and the spring cap, said fork at the lower end of its pivot stud having a center bearing, said hub having in its under side a seat in which the center bearing on the fork is mounted, said hub having a rear extension affording a leaf spring seat, an inverted channel bar extending transversely under the body platform and rigidly secured thereto, and a multiple leaf spring rigidly secured at its longitudinal center to the last noted spring seat, the end portions of the major leaf of the leaf spring extending into the inverted channel bar and supporting the body platform at its rear end portion.

3. In a vehicle of the class described, a pair of rearwardly converging frame bars having on their front ends, members of separable couplings, a casting connecting the frame bars at their rear end portions, a fork, turnably mounted in the casting, a wheel journaled in the fork, said frame bars having on their front end portions, fulcrum members, a body platform resting at its front end portion on the fulcrum members, said body platform having on its under side at its rear end portion, an inverted trans-channel bar, a multiple leaf spring mounted on the casting with the end portions of its major leaf extending into the channel bar with the web of said bar resting thereon, guide members on the channel bar extending under the end portions of the major leaf of the spring and holding the channel bar against lifting movement relative to said major leaf, and means connecting the body platform to the frame bars at the fulcrum members with freedom to permit hinge-like movements of the frame bars and the body platform.

4. The structure defined in claim 3 in which the end portions of the major leaf of the spring are turned downwardly to afford stops for the guide members to positively limit relative lateral movement of the frame bars and the body platform.

5. In a vehicle of the class described, a pair of rearwardly converging frame channel bars with their webs in opposing relation, said bars having on their front ends, members of separable couplings, a casting connecting the frame bars at their rear end portions, said casting having a rearwardly projecting spring seat, a fork turnably mounted in the casting, a wheel journaled in the fork, the upper flanges of the frame bars being upset at their forward end portions to afford fulcrum members, a body platform resting at its front end portion, on the fulcrum members, said body platform having on its under side, at its rear end portion, an inverted transverse channel bar, a multiple leaf spring mounted on the spring seat with end portions of its major leaf extending into the channel bar with the web of said bar resting thereon, nut-equipped bolts extending through aligned holes in the flanges of the frame bars, under the end portions of said major leaf, and holding the channel bar against lifting movement relative to said major leaf, and nut-equipped bolts connecting the body platform to the upper flanges of the frame bars at the fulcrum members with freedom to permit relative hinge-like movements of the frame bars and the body platform.

DALE R. WITTKE.

REFERENCES CITED

The following references are of record in the file of this patent:

UNITED STATES PATENTS

| Number | Name | Date |
|---|---|---|
| 2,033,298 | Pribil | Mar. 10, 1936 |
| 2,094,050 | Wachter | Sept. 28, 1937 |
| 2,213,967 | Roche | Sept. 10, 1940 |
| 2,384,795 | Canady | Sept. 18, 1945 |

FOREIGN PATENTS

| Number | Country | Date |
|---|---|---|
| 103,368 | Australia | Mar. 10, 1938 |
| 108,914 | Australia | Nov. 9, 1939 |
| 463,641 | Great Britain | Apr. 5, 1937 |